United States Patent [19]
Price et al.

[11] Patent Number: 5,450,458
[45] Date of Patent: Sep. 12, 1995

[54] METHOD AND APPARATUS FOR PHASE-ALIGNED MULTIPLE FREQUENCY SYNTHESIZER WITH SYNCHRONIZATION WINDOW DECODER

[75] Inventors: Warren E. Price, Boca Raton, Fla.; Kenneth A. Uplinger, Austin, Tex.

[73] Assignee: International Business Machines Corporation, Armonk, N.Y.

[21] Appl. No.: 286,822

[22] Filed: Aug. 5, 1994

[51] Int. Cl.$^6$ ............................................. H04L 7/00
[52] U.S. Cl. ..................................... 375/356; 375/371; 370/105.3; 327/145
[58] Field of Search ............... 375/354, 356, 371, 373, 375/376; 370/100.1, 105.3; 326/93; 327/105, 107, 141, 144, 145

[56] References Cited

U.S. PATENT DOCUMENTS

| | | | |
|---|---|---|---|
| 4,563,657 | 1/1986 | Qureshi et al. | 331/25 |
| 4,672,299 | 6/1987 | Grimes et al. | 327/217 |
| 4,692,932 | 9/1987 | Denhez et al. | 375/356 |
| 4,716,578 | 12/1987 | Wight | 375/293 |
| 4,756,011 | 7/1988 | Cordell | 375/371 |
| 4,843,617 | 6/1989 | Marshall et al. | 375/371 |
| 5,006,979 | 4/1991 | Yoshie et al. | 395/550 |
| 5,084,681 | 1/1992 | Kovalick et al. | 327/106 |
| 5,101,417 | 3/1992 | Richley et al. | 375/206 |
| 5,115,455 | 5/1992 | Samaras et al. | 375/354 |
| 5,126,690 | 6/1992 | Bui et al. | 331/1 A |
| 5,146,585 | 9/1992 | Smith, III | 392/550 |
| 5,157,341 | 10/1992 | Fobbester et al. | 327/7 |
| 5,197,086 | 3/1993 | Jackson et al. | 375/373 |

FOREIGN PATENT DOCUMENTS

0522774A2 1/1993 European Pat. Off. ........ H04Q 7/04

OTHER PUBLICATIONS

"Phase Locked Oscillator Compensation Circuit", Gindi. Technical Disclosure Bulletin, Dec., 1973 at p. 2142.

"Compatible Clocking Circuit for Different Microprocessors used in Personal Computer Systems", Holness. Technical Disclosure Bulletin, Mar., 1992, at pp. 86–89.

Gazelle spec. sheet re GA111OE–Multi–Phase Clock Generator Low–Skew TTL Clock Buffer Sep. 1989.

TQS Computing and Networking spec. sheet re GA10-86–Ultra Low–Skew, 10–Output Clock Buffer May 1970.

*Primary Examiner*—Young Tse
*Attorney, Agent, or Firm*—Robert S. Babayi; William N. Hogg

[57] ABSTRACT

Data transfer between subsystems of an information handling system employing a multiple subsystem clock environment architecture, or between multiple information handling systems operating with different clock frequencies, is synchronized using a timing aligned multiple frequency synthesizer with a synchronization window decoder. A frequency generation circuit in circuit communication with a data synchronization circuit functions to produce a synchronized timing signal(s) to permit a central processing unit operating in one subsystem clock environment to function with a peripheral subsystem(s), such as a memory controller, operating in a different subsystem clock environment, or permits information handling systems operating with different clock frequencies to function with one another. Data transfer synchronization delays are reduced and mean-time-to-failure of signal synchronization accuracy is increased by eliminating metastability effects from the synchronization circuitry.

15 Claims, 10 Drawing Sheets

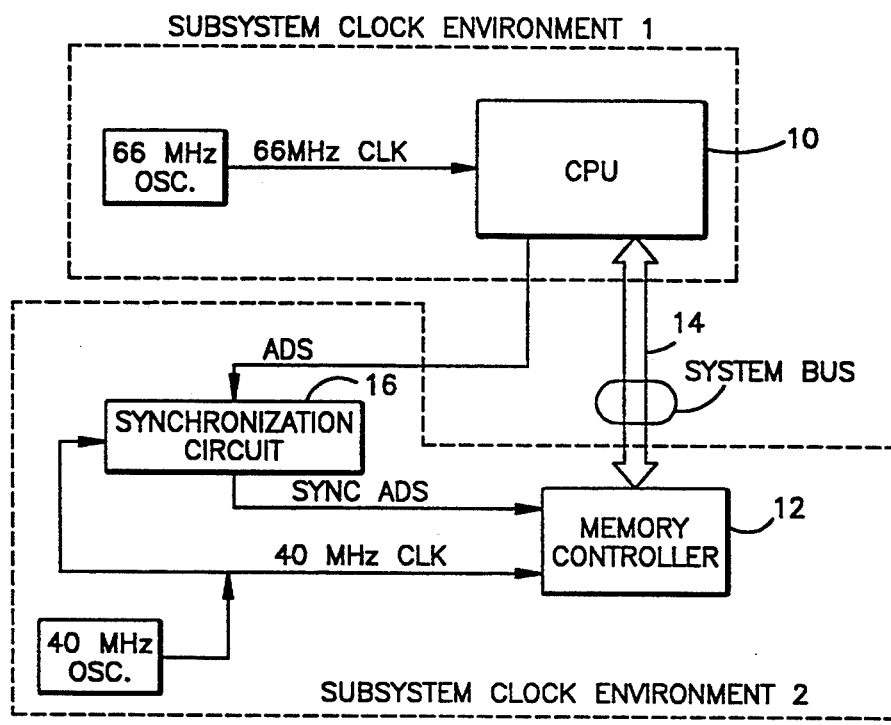
Fig.1 PRIOR ART SYNCHRONIZATION
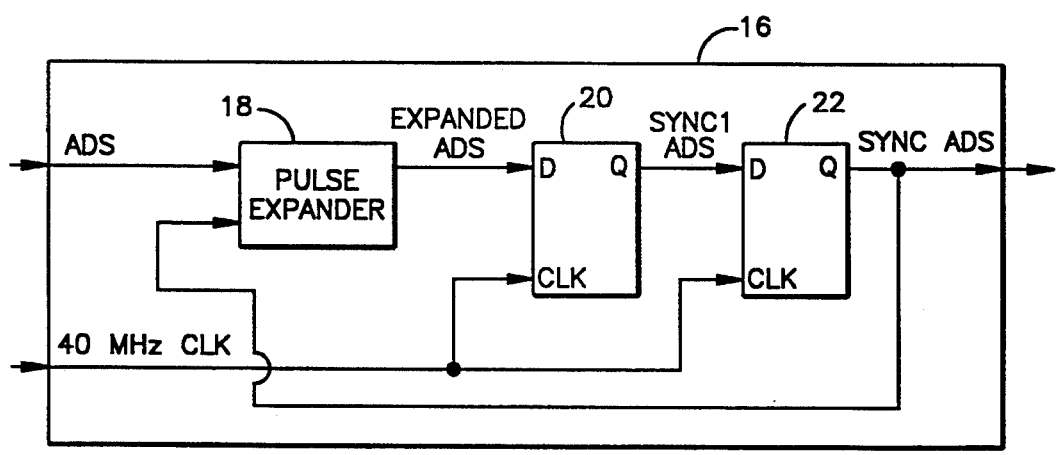
Fig.2 PRIOR ART SYNCHRONIZATION CIRCUIT

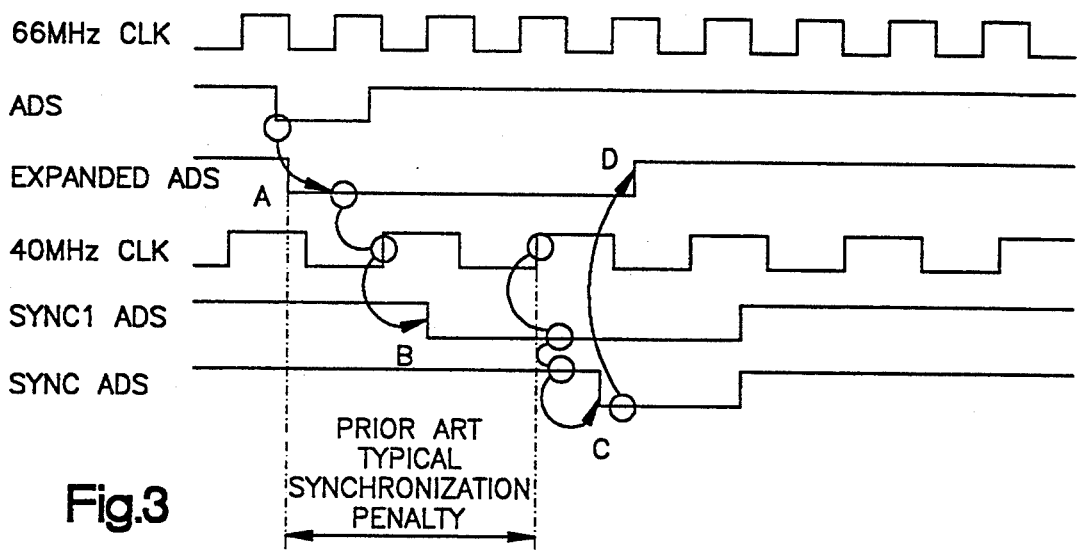
Fig.3 PRIOR ART TYPICAL SYNCHRONIZATION PENALTY
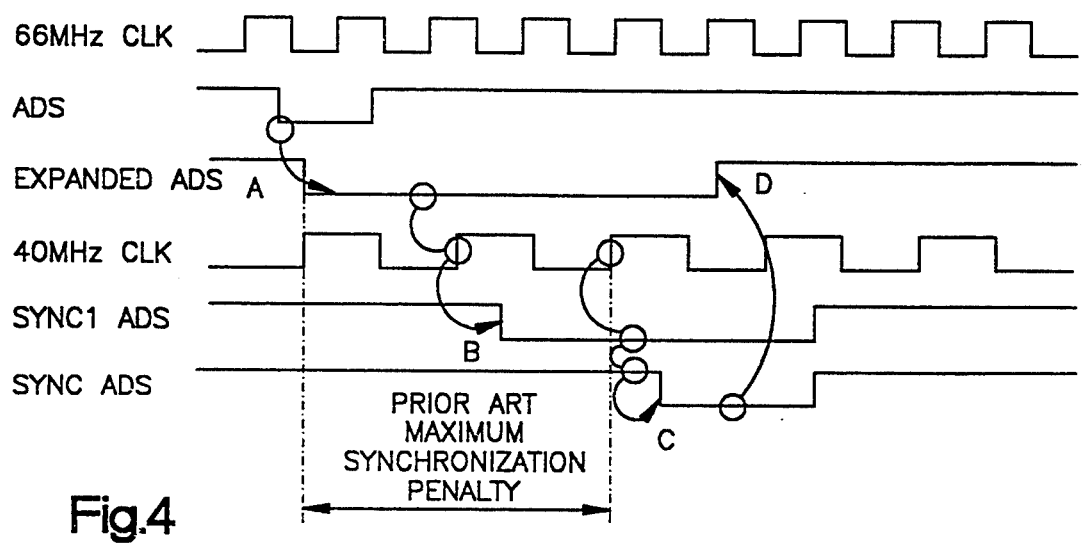
Fig.4 PRIOR ART MAXIMUM SYNCHRONIZATION PENALTY

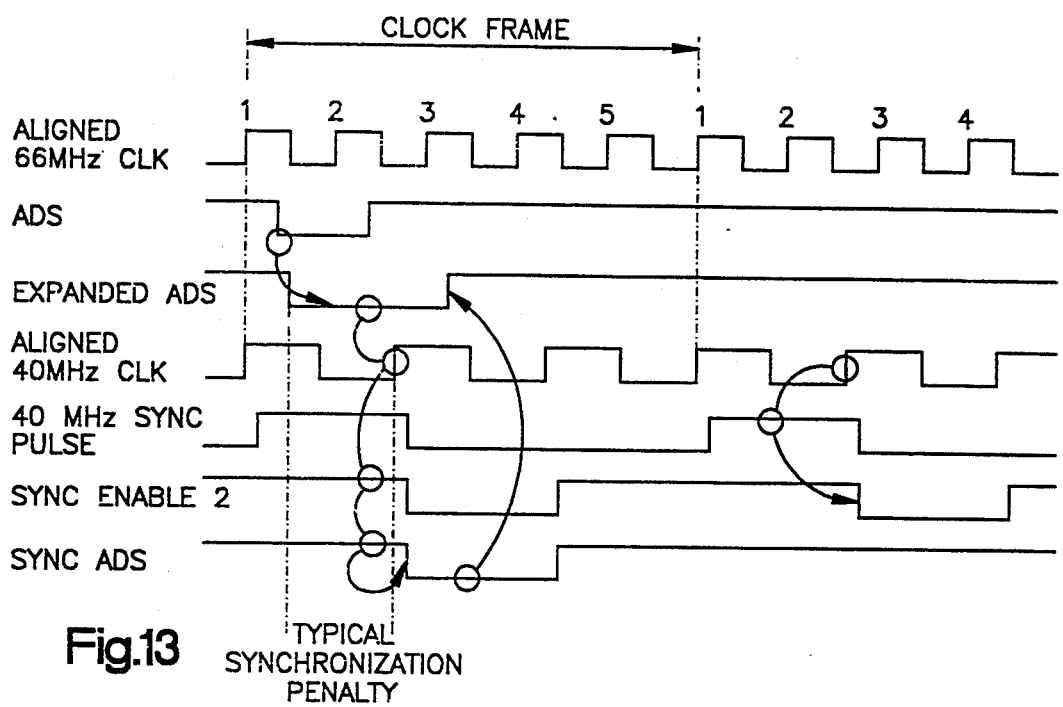
Fig.13 TYPICAL SYNCHRONIZATION PENALTY
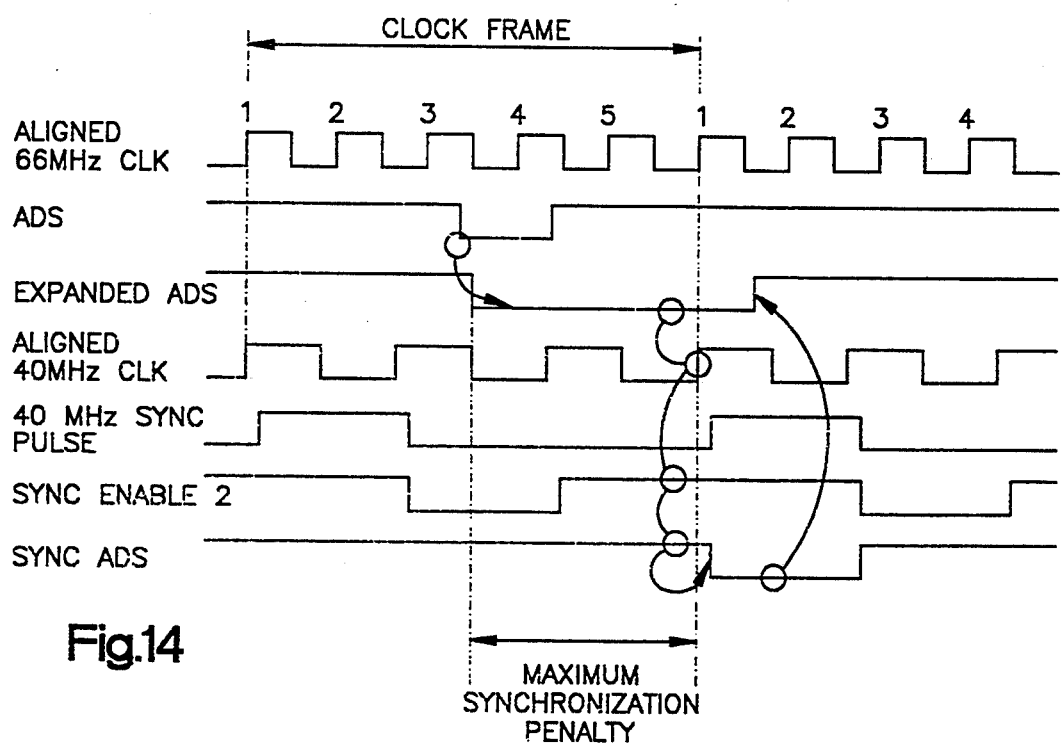
Fig.14
MAXIMUM SYNCHRONIZATION PENALTY

METHOD AND APPARATUS FOR PHASE-ALIGNED MULTIPLE FREQUENCY SYNTHESIZER WITH SYNCHRONIZATION WINDOW DECODER

FIELD OF THE INVENTION

The present invention relates generally to information handling systems, especially to individual digital information handling systems employing subsystems operating with different clock frequencies and which are capable of transferring data between one-another and to multiple digital information handling systems operating with different clock frequencies and which are capable of transferring data between one-another, and, more specifically, to a timing circuit and a clock generation circuit operating with a synchronization window decoder circuit and a synchronization circuit to produce synchronization signal(s) for data transfer between asynchronous subsystems or between asynchronous systems.

BACKGROUND OF THE INVENTION

In an information handling system using subsystems which are operating at different clock frequencies, the rate of flow of information transfer between the subsystems is not the same and data cannot be effectively transferred because the subsystems are out-of-phase or out-of-time with one-another. A disadvantage to operating subsystems with different clock frequencies is that synchronization circuitry must be added to compensate for differences in the rate of flow of information between the different subsystem clock environments. A "subsystem clock environment" is that part of an information handling system in which the data processing resources are operating at the same clock frequency. Once the data signals of the multiple subsystem clock environments are synchronized, information may then pass between the multiple subsystems over a data bus.

When using the prior art synchronization circuit and method to compensate for differences in the data transfer rate between asynchronous subsystems, the signal being synchronized arrives at the synchronization circuit flip-flop asynchronous relative to the synchronization clock. This condition results in an inability to guarantee that the setup time and hold time specifications of the synchronization circuitry have been met. Thus, the prior art synchronization circuit and method require that the signal being synchronized be clocked initially by at least one synchronization clock to remove any metastability that might result on the subsystem side due to the inability to guarantee that the proper setup time and hold time have been met for the signal to be synchronized, and must be clocked subsequently to produce a final synchronization signal.

The prior art synchronization inherently introduces delays in data transfer across subsystem clock environments, contributes to an overall loss of system performance, and causes the information handling system's performance to be non-competitive when compared to systems using synchronous subsystem design. Therefore, there is a need to be able to reduce synchronization delays incurred when an information handling system uses an asynchronous subsystem design.

SUMMARY OF THE INVENTION

According to the present invention, an information handling system and method of operation thereof are provided which implement subsystems which operate at different clock frequencies and which transfer data between one-another. The first subsystem operates with a first clock signal at a first predetermined frequency and can operate as both a data send subsystem and a data receive subsystem. Similarly, the second subsystem operates with a second clock signal at a second predetermined frequency and can operate as both a data send subsystem and a data receive subsystem. A system bus interfaces the first subsystem and the second subsystem to facilitate data transfer between one-another. A timing circuit generates timing pulses for pacing the operation of the information handling system, preferably using a phase-locked loop frequency synthesizer to generate the timing pulses. A clock generation circuit uses the timing pulses from the timing circuit to generate a first clock signal and a second clock signal. The first clock signal and the second clock signal are generated such that the two signals have a fixed predetermined timing relationship relative to one-another over a clock frame period to minimize the setup time and hold time. In addition, for each clock frame period, the clock generation circuit generates a first sync pulse to signal the first subsystem that timing alignment is established between the first clock and the second clock and a second sync pulse to signal the second subsystem that timing alignment between the first clock and the second clock has occurred. The first subsystem's synchronization window decoder circuit decodes the clock signals and generates a sync enable signal responsive to a second subsystem bus validity signal meeting proper setup time and hold time relative to first subsystem's clock to define a synchronization window in which a bus validity signal from the second subsystem can be sampled by the first subsystem. The second subsystem's synchronization window decoder circuit decodes the clock signals and generates a sync enable signal responsive to a first subsystem bus validity signal meeting proper setup time and hold time relative to second subsystem's clock to define a synchronization window in which a bus validity signal from the first subsystem can be sampled by the second subsystem. The first subsystem's synchronization circuit generates a synchronization signal by clocking the second subsystem bus validity signal on the next clock edge of the first clock signal as qualified by the first subsystem's sync enable signal. This synchronization signal is used to control data transfer from the second subsystem to the first subsystem. The second subsystem's synchronization circuit generates a synchronization signal by clocking the first subsystem bus validity signal on the next clock edge of the second clock signal as qualified by the second subsystem's sync enable signal. This synchronization signal is used to control data transfer from the first subsystem to the second subsystem. The synchronization signals are used by a data transfer device to transfer data between the first subsystem and the second subsystem. Thus, the first subsystem and the second subsystem can transfer data between one-another via the system bus, the transfer of data being responsive to the synchronization signals generated by the synchronization circuits. Similarly, multiple information handling systems operating with different clock frequencies can implement the phase-aligned multiple frequency synthesizer with synchronization window decoder to facilitate data transfer between one another.

These and other objects and advantages of the present invention shall become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above and the detailed description given below, serve to example the principles of this invention.

FIG. 1 is a block diagram illustrating a typical prior art synchronization;

FIG. 2 is a block diagram illustrating a typical prior art synchronization circuit;

FIG. 3 is a timing diagram depicting a typical synchronization penalty for a prior art synchronization;

FIG. 4 is a timing diagram depicting the maximum synchronization penalty for a prior art synchronization;

FIG. 13 is a timing diagram depicting a typical synchronization penalty for the decoded synchronization window of this invention; and FIG. 14 is a timing diagram depicting the maximum synchronization penalty for the decoded synchronization window of this invention.

DETAILED DESCRIPTION OF THE PREFERRED EMBODIMENT

Figure 5:
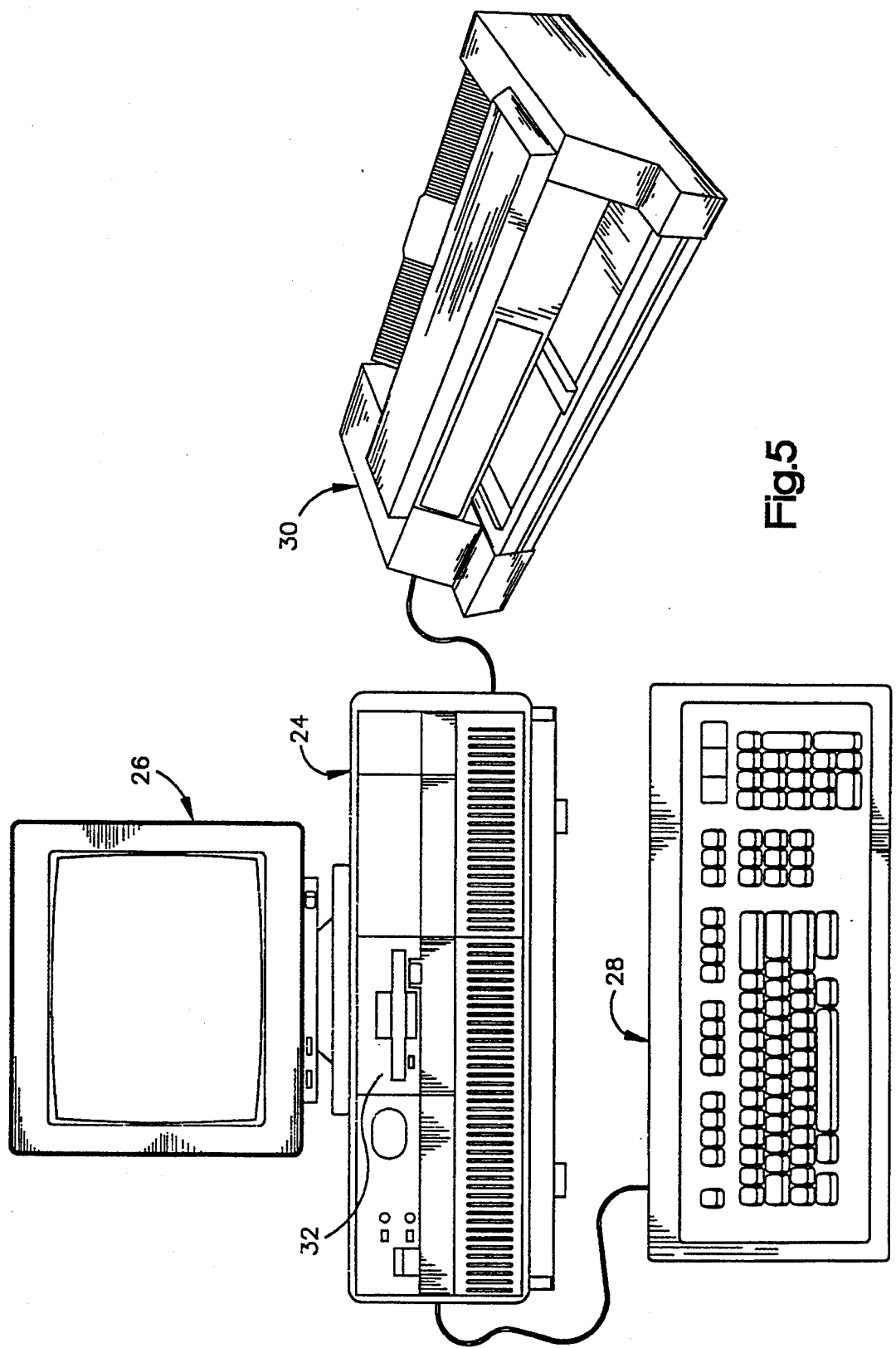
FIG. 5 is a perspective view of a type of information handling system that may contain the phase aligned multiple frequency synthesizer with synchronization window decoder of this invention.

Before describing the details of the present invention, a brief description of a prior art signal synchronization will assist in understanding the advantages of the phase aligned multiple frequency synthesizer with synchronization window decoder as incorporated in an information handling system according to the present invention.

Synchronization can be used to compensate for differences in the flow rate of information when transferring information between subsystems operating in different subsystem clock environments. A prior art synchronization which can be used to compensate for differences in the data transfer rate between asynchronous subsystems, e.g., Central Processing Unit 10 and Memory Controller 12, operating in different subsystem clock environments over System Bus 14 is shown in FIG. 1. Referring to FIG. 2, prior art synchronization requires generating with Pulse Expander 18 of Synchronization Circuitry 16 an expanded pulse signal (EXPANDED ADS) which is derived from the Central Processing Unit's 10 initial address strobe signal (ADS). The expanded pulse signal (EXPANDED ADS) is then clocked by the subsystem clock (40 MHZ CLK) in First D Flip-Flop 20 to produce an intermediate synchronization signal (SYNC1 ADS) to remove any resulting metastability on the subsystem side. The intermediate synchronization signal (SYNC1 ADS) is then clocked with the subsystem clock (40 MHZ CLK) in Second D Flip-Flop 22 to produce a final synchronization signal (SYNC ADS). The final synchronization signal (SYNC ADS) is then fed into Memory Controller 12 to facilitate synchronized data transfer between Memory Controller 12 and Central Processing Unit 10 over System Bus 14. This prior art synchronization inherently introduces delays in signals which cross subsystem clock environments and contributes to an overall loss of system performance.

FIGS. 3 and 4 show the delays encountered by a prior art synchronization for an information handling system requiring very high mean-time-to-failure for the data transfer. The delays are illustratively shown as timing diagrams wherein the central processing unit is operating with a 66 MHz clock and the subsystem is operating with a 40 MHz clock; although any number of clock frequencies can be employed. In this example, an ADS signal ("address status" signal, which is an address strobe of the well known Intel i86 family of microprocessors) originates from a microprocessor after the rising edge of the 66 MHz clock to indicate the start of a bus cycle. The ADS signal is then expanded to a larger pulse as indicated by transition A in the timing diagram. The EXPANDED ADS signal is then clocked by the 40 MHz CLK to produce SYNC1 ADS in transition B. Since the EXPANDED ADS is asynchronous to the 40 MHz clock, this signal must be clocked at least once by the 40 MHz clock to remove any metastability that might result on the 40 MHz subsystem side as a result of improper setup time. In extreme cases, the EXPANDED ADS signal may require two clock cycles to provide acceptable data transfer accuracy. The final result of the synchronization process is the signal SYNC ADS, which is the product of transition C and which can be readily accepted by a 40 MHz clocked memory controller. With the SYNC ADS signal generated, EXPANDED ADS can be deactivated with transition D. When utilizing this synchronization, the maximum synchronization penalty between the EXPANDED ADS signal and the desired SYNC ADS signal is 50 nanoseconds or 2.0 cycles of the 40 MHz clock, and the average synchronization penalty is 37.5 nanoseconds or 1.5 cycles of the 40 MHz clock. Therefore, in this prior art synchronization a maximum two clock cycle delay penalty is incurred for any signal crossing subsystem clock environments between the microprocessor and the memory controller. The synchronization penalty in this example only applies to initiating the cycle and does not include time lost in the synchronization of a signal required to terminate the same cycle. Thus, a significant synchronization penalty and an overall loss of system performance are incurred when using this prior art synchronization.

In accordance with this invention, the solution to the problem is achieved by combining a phase aligned multiple frequency synthesizer with a synchronization window decoder to facilitate synchronized data transfer between asynchronous subsystems. Data synchronization achieved by this invention results in a reduction of both the average synchronization delay and maximum synchronization delay incurred by the prior art synchronization. According to the present invention, synchronization delays associated with the data transfer function for asynchronous subsystems are reduced by referencing the timing of signals of the data send subsystem to the timing of signals of the data receive subsystem.

In a typical information handling system design, system processors communicate with peripheral devices, such as memory controllers and peripheral bus bridges, via buses. A typical system processor generates one or more bus validation signals when a subset of the bus signals have met certain predetermined conditions. For example, the system processor can generate a bus validation signal to define the start of a bus cycle in response to a bus signal meeting a predetermined setup time, i.e., the bus validation signal indicates to the memory controller that the predetermined setup time has been met by indicating either valid address, cycle definition, status, or data present on the bus. One well known bus validation signal is an address strobe, which is asserted by the system processor after the lines of the address bus have been asserted for a certain setup time, i.e., the address lines are valid. For example, Intel's well known 80486 processor has one bus validation signal which is asserted as an address status signal (ADS#) to indicate to peripheral devices that the values on the address lines are valid. As another example, Motorola's well-known MC68030 has two bus validation signals known as an address strobe ($\overline{AS}$) and a data strobe ($\overline{DS}$) which are asserted when the address values and data values are valid (have met the minimum setup time) on their respective buses. In information handling systems employing multiple subsystem clock environments, all of these bus validation signals can become more effective using the synchronization system of the present invention.

When using asynchronous subsystems, such as memory controllers and peripheral bus bridges, receive information over the bus responsive to the central processing unit's synchronized bus validity signal. Peripheral devices also generate a bus validity signal for transferring information to the central processing unit. The bus validity signal undergoes a synchronization process to reference its timing relative to the central processing unit clock. For example, the memory controller can generate a bus validity signal to define the end of a bus cycle in response to a bus signal meeting a predetermined setup time, i.e., the bus validation signal indicates to the central processing unit that the predetermined setup time has been met by indicating either valid address, cycle definition, status, or data present on the bus. One well known bus validation signal is a ready signal, which is asserted by the memory controller after the lines of the data bus have been asserted for a certain setup time, i.e., the data lines are valid. In information handling systems employing multiple subsystem clock environments, these peripheral device bus validation signals can become more effective using the synchronization system of the present invention.

Devices used for transferring data between the subsystems are application specific and are known to those skilled in the art. For example, the data source subsystem can use a bus driving circuit, such as a bank of tri-stated buffers, and the data target subsystem can use a latching circuit, such as a bank of D-latches.

Figure 6:
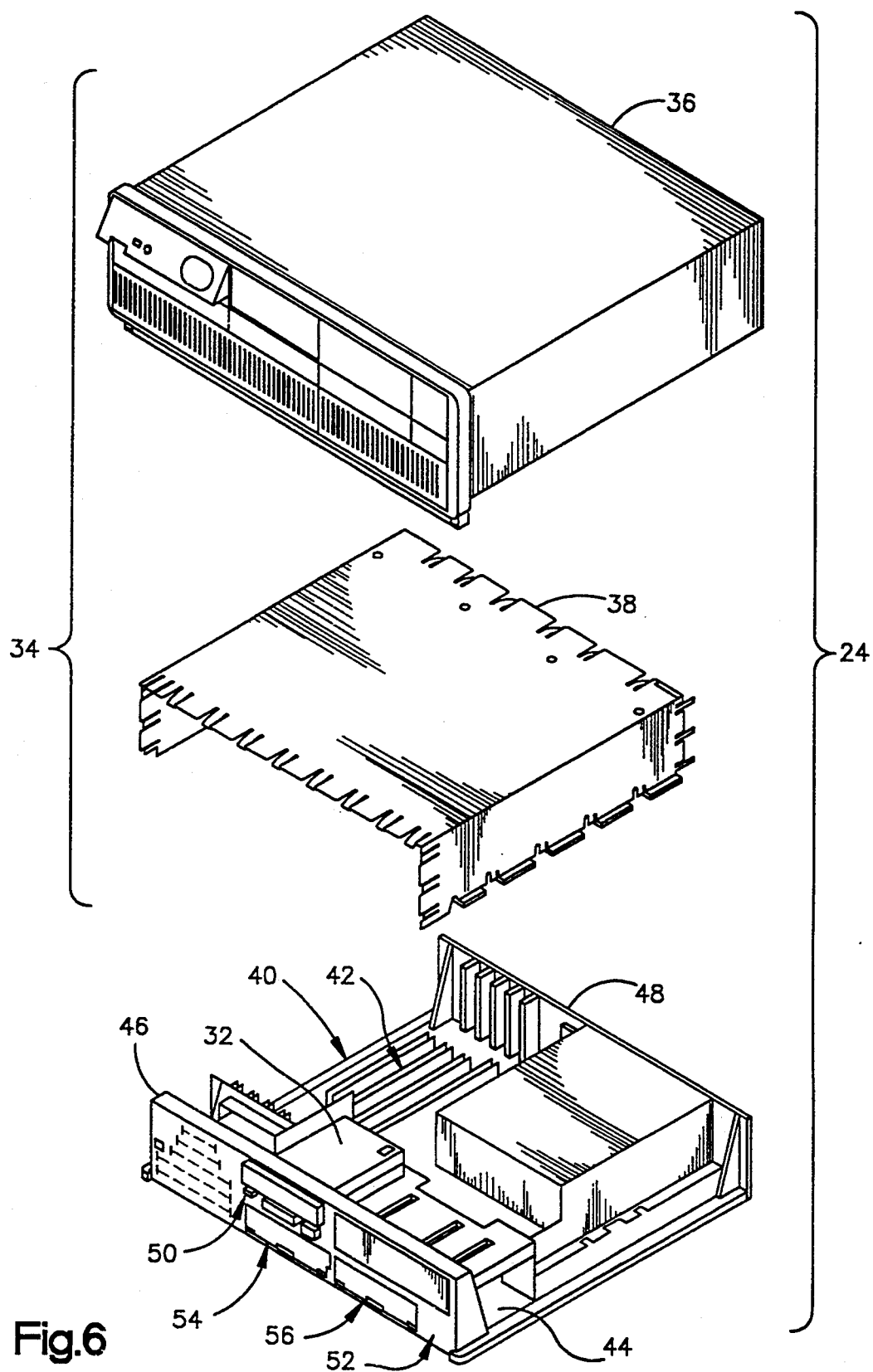
FIG. 6 is an exploded perspective view of certain elements of the information handling system of FIG. 5, including a chassis, a cover, an electromechanical direct access storage device, and a planar board, and illustrating certain relationships among those elements.

Referring now to FIG. 5, an Information Handling System embodying the Phase Aligned Multiple Frequency Synthesizer with Synchronization Window Decoder of the present invention is shown and generally indicated at 24. The Information Handling System 24 may have an associated Monitor 26, Keyboard 28, a Printer or Plotter 30, and a Floppy Disk Drive 32. Referring to FIG. 6, the Information Handling System 24 has a Cover 34 formed by a decorative Outer Member 36 and an Inner Shield Member 38 which cooperate with the Chassis 40 in defining an enclosed, shielded volume for receiving electrically powered data processing and storage components for processing and storing digital data. At least certain of these components are mounted on a multilayer Planar Board or Motherboard 42 which is mounted on the Chassis 40 and provides a means for electrically interconnecting the components of the Information Handling System 24 including those identified above and such other associated elements as floppy disk drives, various forms of direct access storage devices, accessory cards or boards, and the like. As pointed out more fully hereinafter, provisions are made in the Planar Board 42 for the passage of input/output (I/O) signals to and from the operating components of the Information Handling System 24.

The Chassis 40 has a Base 44, a Front Panel 46, and a Rear Panel 48. The Front Panel 46 defines at least one open bay (and in the form illustrated, four bays) for receiving a data storage device such as a disk drive for magnetic or optical disks, a tape backup drive, or the like. In the illustrated form, a First Upper Bay 50, a Second Upper Bay 52, a First Lower Bay 54, and a Second Lower Bay 56 are provided. The First Upper Bay 50 is adapted to receive peripheral drives of a first size (such as those known as 3.5 inch drives) while the Second Upper Bay 52 is adapted to receive drives of a selected one of two sizes (such as 3.5 inch and 5.25 inch). The First Lower Bay 54 and the Second Lower Bay 56 are adapted to receive devices of only one size (3.5 inch). One Floppy Disk Drive 32 is a removable media direct access storage device capable of receiving a diskette inserted thereinto and using the diskette to receive, store, and deliver data as is generally known.

Figure 7:
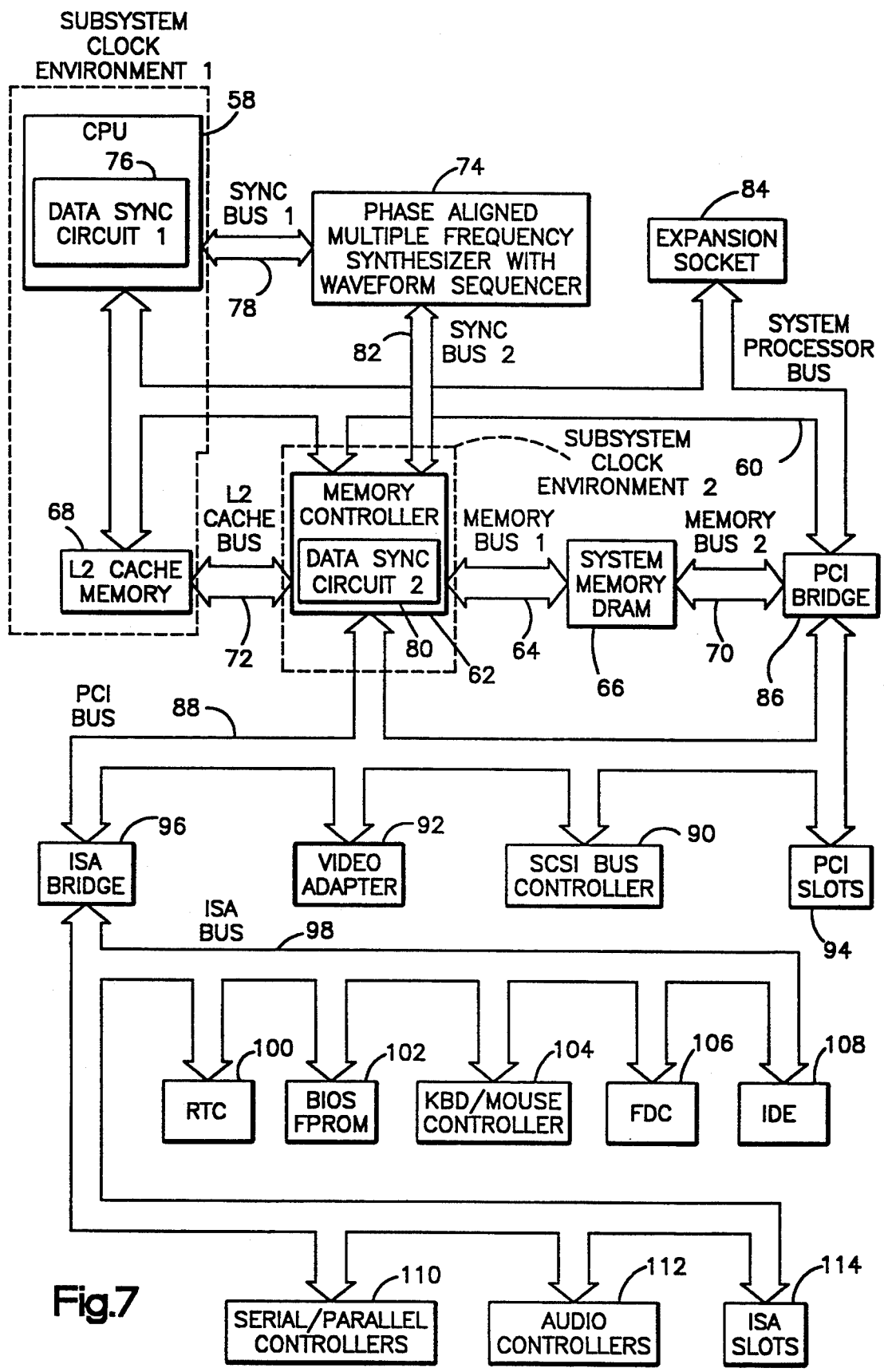
FIG. 7 is a block diagram representation of certain components of the information handling system of FIG. 5 and FIG. 6.

Prior to relating the above structure to the present invention, a summary of the operation in general of the Information Handling System 24 may merit review. Referring to FIG. 7, there is shown a block diagram of an Information Handling System illustrating the various components of the Information Handling System, such as the System 24, in accordance with the present invention, including components mounted on the Planar Board 42 and the connection of the Planar Board 42 to the I/O slots and other hardware of the Information Handling System 24. Connected to the Planar Board 42 is the Central Processing Unit (CPU) 58 comprised of a microprocessor which is connected by a high speed central processing unit System Processor Bus 60 to a Memory Controller 62 which is further connected via a First Memory Bus 64 to a System Memory 66 using Dynamic Random Access Memory (DRAM). While any appropriate microprocessor can be used, one suitable microprocessor is the "Pentlure" processor which is manufactured by Intel Corporation.

A description of a circuit representative of industry standard architecture, including a CPU, a Level 2 (L2) Cache Memory, a Memory Controller, a System Memory, and a PCI Bridge can be found in the publication, 82420 PCIset Universal Motherboard Design Guide, which is available from Intel Corporation Literature, P.O. Box 7641, Mt. Prospect, Illinois 60056-7641. While this publication describes industry standard architecture, its description of the aforementioned subsystems operating in a unified system clock environment does not specifically discuss the multiple subsystem clock environment architecture into which the claimed invention is designed to be integrated.

While the present invention is described hereinafter with particular reference to the system block diagram of FIG. 7, it is to be understood that the apparatus and methods in accordance with the present invention may be used with other planar board hardware configurations. For example, the system processor could be an 80286, 80386, or 80486 microprocessor manufactured by Intel Corporation or Advanced Micro Devices, Incorporated.

Referring now to the drawings, and specifically to FIG. 7, an Information Handling System 24 using the phase aligned multiple frequency synthesizer with synchronization window decoder of the present invention is shown. The Information Handling System 24 includes a Central Processing Unit (CPU) 58 having a System Processor Bus 60 associated therewith which is used for transferring data. Many possible processors can be used to implement the CPU 58. One suitable processor is the well known "Pentium" processor, which is manufactured by Intel Corporation. In circuit communication with the CPU 58 via the System Processor Bus 60 are a Level 2 (L2) Cache Memory 68 and a Memory Controller 62. The L2 Cache Memory 68 is a relatively small bank of memory dedicated to the CPU 58, as should be known to those skilled in the art.

Associated with the Memory Controller 62 is a First Memory Bus 64, a Second Memory Bus 70, and a L2 Cache Bus 72, all of which are used for transferring data. A System Memory 66 is in circuit communication with the Memory Controller 62 via the First Memory Bus 64, as should be known to those skilled in the art. A suitable memory for use in the System Memory 66 includes the common Single In-Line Memory Modules (SIMMs). The L2 Cache Memory 68 is in circuit communication with the Memory Controller 62 via the L2 Cache Bus 72, as should be known to those skilled in the art.

Associated with the CPU 58 and the Memory Controller 62 is a Phase Aligned Multiple Frequency Synthesizer 74. Integrated with the CPU 58 is the First Data Synchronization Circuit 76 and integrated with the Memory Controller 62 is the Second Data Synchronization Circuit 78. The Phase Aligned Multiple Frequency Synthesizer with Waveform Sequencer 74 is in circuit communication with the CPU 58 and the First Data Synchronization Circuit 76 via the First Synchronization Bus 78 over which the CLK 1 signal and the SYNC PULSE 1 signal are transferred. The Phase Aligned Multiple Frequency Synthesizer with Waveform Sequencer 74 is also in circuit communication and with the Memory Controller 62 and the Second Data Synchronization Circuit 80 via the Second Synchronization Bus 82 over which the CLK 2 signal and the SYNC PULSE 2 signal are transferred. Thus, it is to be understood that this invention's synchronization window decoder function which is used to facilitate data transfer from the Memory Controller 62 to the CPU 58 can be integrated into the CPU 58 and this invention's synchronization window decoder function which is used to facilitate data transfer from the CPU 58 to the Memory Controller 62 can be integrated into the Memory Controller 62. The synchronization window decoder function of this invention assists in reducing both the average synchronization penalty and the maximum synchronization penalty incurred for data transfer between asynchronous subsystems. In addition, it is to be understood that the synchronization window decoder function of this invention can be integrated into other subsystems operating in different subsystem clock environments to reduce both the average synchronization penalty and the maximum synchronization penalty incurred for data transfer between asynchronous subsystems.

Associated with the Information Handling System 24 is an Expansion Socket 84 in circuit communication with the System Processor Bus 60.

The Information Handling System 24 also has a PCI (Peripheral Component Interconnect) Bridge 86. The PCI Bridge 86 has associated with it a PCI Bus 88 which is used for transferring data. In circuit communication with the CPU 58 are a SCSI (Small Computer System Interface) Bus Controller 90 and a Video Adapter 92 via the PCI Bus 88, the PCI Bridge 86, and the System Processor Bus 60, as should be known to those skilled in the art.

Associated with the Information Handling System 24 are PCI Slots 94 in circuit communication with the PCI Bus 88.

The Information Handling System 24 also has an Industry Standard Architecture (ISA) Bridge 96. The ISA Bridge 96 has associated with it an ISA Bus 98 which is used for transferring data. In circuit communication with the CPU 58 are a Real Time Clock (RTC) 100, a Basic Input/Output System Flash Programmable Read Only Memory (BIOS FPROM) 102, a Keyboard/Mouse Controller 104, a Floppy Disk Controller 106, an IDE Hard Disk Controller 108, Serial/Parallel Controllers 110, and Audio Controllers 112 via the ISA Bus 98, the ISA Bridge 96, the PCI Bus 88, the PCI Bridge 86, and the System Processor Bus 60, as should be known to those skilled in the art.

Associated with the Information Handling System 24 are ISA Expansion Slots 114 in circuit communication with the ISA Bus 98.

Using the phase aligned multiple frequency synthesizer with synchronization window decoder of the present invention, the subsystems operating in two different subsystem clock environments illustrated in FIG. 7 can operate with improved system performance by decreasing the synchronization penalties incurred by the signal synchronization used in the prior art. System performance can be further improved by using the invention to reduce synchronization delays for the subsystems interfacing the PCI Bridge 86 through the PCI Bus 88. System performance can be still further improved by using the invention to reduce synchronization delays for PCI Bridge 86 interfacing CPU 58 through System Processor Bus 60.

The system components operating at different clock frequencies, i.e., in different subsystem clock environments, described in the text accompanying FIG. 7 can make use of the phase aligned multiple frequency synthesizer with synchronization window decoder 74 of the present invention. Any device controlled by a state machine or requiring a multiphase clock can be implemented using the phase aligned multiple frequency synthesizer with synchronization window decoder 74 of the present invention.

Figure 8:
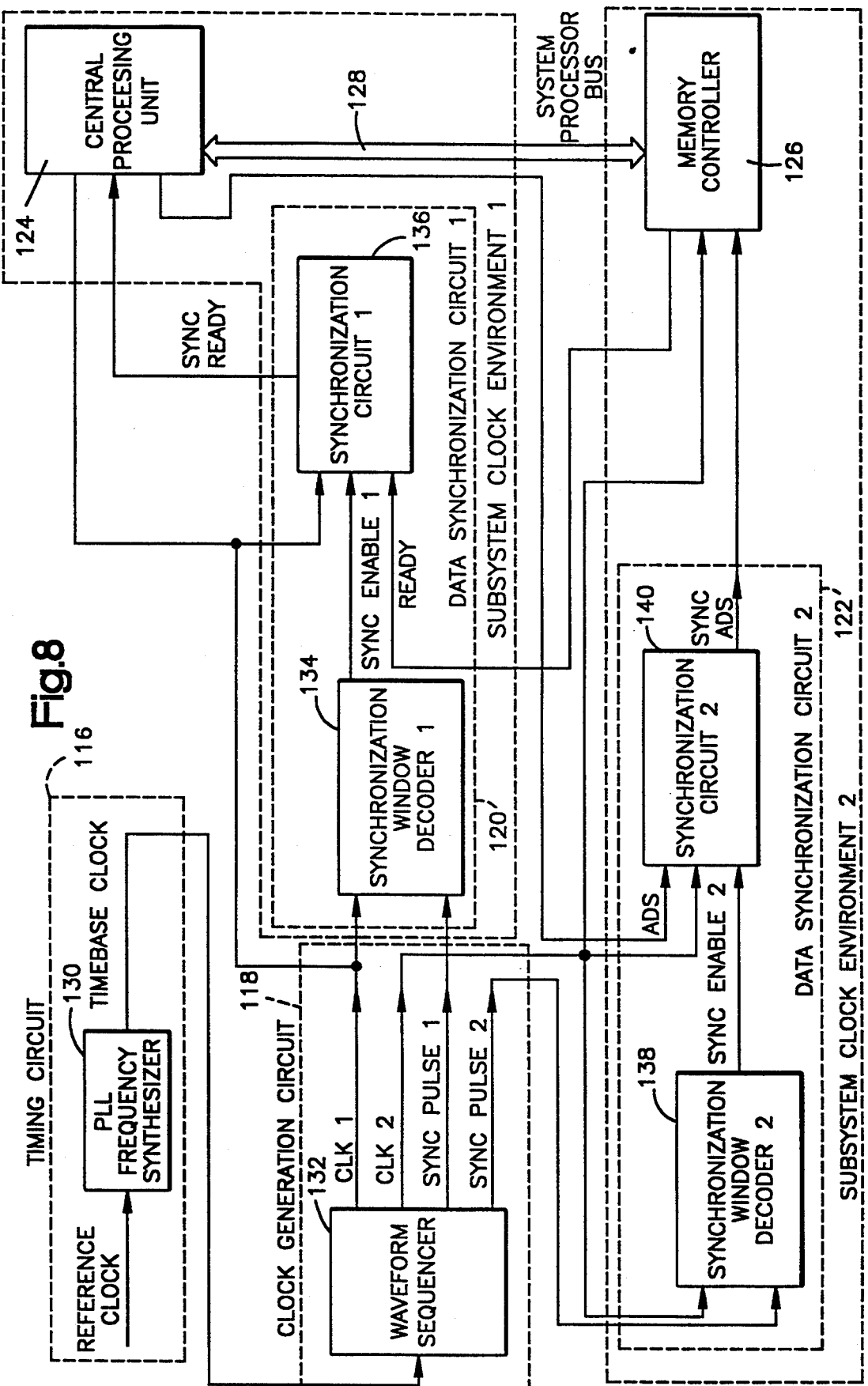
FIG. 8 is a block diagram illustrating the key elements of this invention.

The major elements of the invention are shown in FIG. 8. Referring to FIG. 8, Timing Circuit 116, Clock Generation Circuit 118, First Data Synchronization Circuit 120, Second Data Synchronization Circuit 122, System Processor 124, Memory Controller 126, and System Processor Bus 128 are provided. Timing Circuit 116 comprises Phase-Locked Loop (PLL) Frequency Synthesizer 130. Clock Generation Circuit 118 comprises Waveform Sequencer 132. First Data Synchronization Circuit 120 comprises First Synchronization Window Decoder 134 and First Synchronization Circuit 136. Second Data Synchronization Circuit 122 comprises Second Synchronization Window Decoder 138 and Second Synchronization Circuit 140.

Referring to Timing Circuit 116, PLL Frequency Synthesizer 130 is provided for the purpose of generating a high frequency signal, TIMEBASE CLOCK, which comprises timing pulses for the information handling system operation. The TIMEBASE CLOCK signal is then used as an input to Waveform Sequencer 132 of Clock Generation Circuit 118, which in turn generates multiple frequency clock signals, CLK 1 and CLK 2, which are timing aligned relative to one another over a period of time referred to as a "clock frame." Waveform Sequencer 132 also provides multiple sync pulses, SYNC PULSE 1 and SYNC PULSE 2, within every clock frame period for the purpose of conveying timing information to First Data Synchronization Circuit 120 and to Second Data Synchronization Circuit 122. First Synchronization Window Decoder 134, upon receiving the input clock signal, CLK 1, and the corresponding timing information signal, SYNC PULSE 1, generates an enable signal, SYNC ENABLE 1, which signals First Synchronization Circuit 136 that the input bus validity signal, READY, can be clocked immediately by CLK 1. First Synchronization Circuit 136 generates a synchronization signal, SYNC READY, to synchronize data transfer from Memory Controller 126 in the second subsystem clock environment to System Processor 124 in the first subsystem clock environment via System Processor Bus 128. Second Synchronization Window Decoder 138, upon receiving the input clock signal, CLK 2, and the corresponding timing information signal, SYNC PULSE 2, generates an enable signal, SYNC ENABLE 2, which signals Second Synchronization Circuit 140 that the input bus validity signal, ADS, can be clocked immediately by CLK 2. Second Synchronization Circuit 140 generates a synchronization signal, SYNC ADS, to synchronize data transfer from System Processor 124 in the first subsystem clock environment to Memory Controller 126 in the second subsystem clock environment via System Processor Bus 128. It is to be appreciated that this invention may be applied to facilitate any two-way transfer of data between subsystems which are operating asynchronous to one-another. It is to be still further appreciated that this invention may be applied to facilitate one-way transfer of data between a data send subsystem and a data receive subsystem which are operating asynchronous to one-another. It is to be still further appreciated that this invention may be applied to facilitate transfer of data transfer between multiple subsystems operating in multiple clock environments.

Clock Generation Circuit 118 produces multiple clock signals having different frequencies and a fixed predetermined timing relationship. Clock Generation Circuit 118 also produces multiple synchronization pulses which correspond to the timing relationship of the clock signals it produces.

The term "fixed predetermined timing relationship" as used herein indicates that periodically, the rising edge or falling edge of the first clock signal is separated in time by a fixed predetermined period of time from the respective rising edge or falling edge of the second clock signal. For example, in an information handling system having a 66 MHz subsystem clock environment and a 40 MHz subsystem clock environment, if the two clock frequencies are stable, then the respective rising edges of the two clock signals or the respective falling edges of the two clock signals will be separated by the same amount of time every five periods of the 66 MHz clock and every three periods of the 40 MHz clock. That is, periodically the respective rising edges or the respective falling edges of the two clocks will be separated by the same amount of time. In the present invention, the relationship between the periodic rising edges is predetermined to minimize the synchronization penalty. For example, in one embodiment of the present invention a system might minimize the synchronization penalty when the respective periodic rising edges or respective periodic falling edges are "timing aligned," i.e., the periodic rising edges or the periodic falling edges occur substantially simultaneously. On the other hand, in a different embodiment, an information handling system might minimize the synchronization penalty when the respective periodic rising edges or the respective periodic falling edges are separated by a fixed value, e.g., 5 nanoseconds. The specific fixed predetermined timing relationship will depend on the nature of the devices used in the different subsystem clock environments.

First Data Synchronization Circuit 120 and Second Data Synchronization Circuit 122 decode the multiple clock signals to define synchronization windows in which data signals can be sampled. It is, therefore, an advantage of this invention to reduce both the average synchronization penalty and the maximum synchronization penalty incurred when operating peripheral subsystems at clock frequencies different from the central processing unit clock frequency. It is a further advantage of this invention to eliminate metastability effects of the prior art synchronization and to eliminate the data transfer synchronization mean-time-to-failure incurred by the prior art synchronization.

Figure 9:
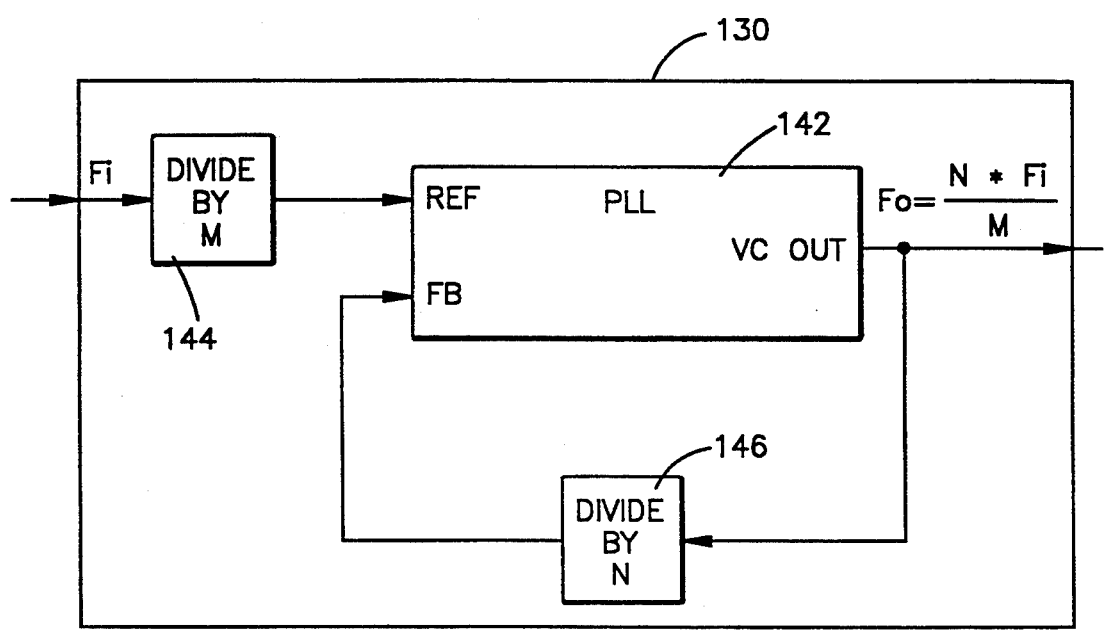
FIG. 9 is a block diagram illustrating a timing circuit phase-locked loop frequency synthesizer.

The system clock, TIMEBASE CLOCK, is generated by Timing Circuit 16 which uses PLL Frequency Synthesizer 130 to derive the TIMEBASE CLOCK from a reference clock, REFERENCE CLOCK. PLLs are readily used for the purpose of producing a desired frequency from a reference clock. Some of the currently available PLLs can operate internally with frequencies as high as 500 MHz. The use of a PLL Frequency Synthesizer 130 is desirable for higher frequency applications because higher frequency signals are generally not capable of being integrated into a printed circuit board design. However, in lower frequency applications an oscillator may be substituted for the PLL Frequency Synthesizer 130. Referring to FIG. 9, a typical implementation of PLL Frequency Synthesizer 130 is shown. PLL Device 142 is used to produce the output signal, Fo, as an N+M multiple of the REFERENCE CLOCK signal, F1. The Divide-by-M function can be implemented using First Ring Counter 144 and the Divide-by-N function can be implemented using Second Ring Counter 146. The variable M may be an even integer or an odd integer and the variable N may be an even integer or an odd integer.

The desired signal frequency, Fo, of PLL Frequency Synthesizer 130 determines the TIMEBASE CLOCK signal and controls the granularity by which CLK 1, CLK 2, SYNC PULSE 1, and SYNC PULSE 2 are generated. In addition, the signal Fo defines the granularity of the timing relationship between signals CLK 1 and CLK 2. Consequently, it is desirable to have a TIMEBASE CLOCK frequency many times that of the CLK 1 frequency and the CLK 2 frequency.

By using the TIMEBASE CLOCK signal, Waveform Sequencer 132 can be used to produce two separate frequency clocks, $F_{CLK1}$ and $F_{CLK2}$, that have a fixed predetermined timing relationship over a clock frame period. A "clock frame period" is defined as the periodic unit of time at which the respective rising clock edges or respective falling clock edges of CLK 1 and CLK 2 are timing aligned. "Timing aligned" means that periodically the respective rising clock edges or respective falling clock edges of CLK 1 and CLK 2 have a fixed predetermined timing relationship to minimize the synchronization penalty. For example, periodically the rising clock edges of CLK 1 and CLK 2 are substantially aligned and periodically the falling clock edges of CLK 1 and CLK 2 are substantially aligned. The clock frame period, $T_{frame}$, can then be calculated according to the following equations:

$$K \frac{1}{F_{CLK1}} = L \frac{1}{F_{CLK2}}$$

Where K and L are the smallest integer values greater than or equal to 1 which satisfy the above equation with $T_{frame}$ then specified as:

$$T_{frame} = K \frac{1}{F_{CLK1}}$$

Thus, a 66 MHz signal and a 40 MHz signal can be rising edge aligned to a fixed predetermined timing relationship at every fifth 66 MHz rising clock edge and every third 40 MHz rising clock edge, and the $T_{frame}$ is equal to 75 nanoseconds. With such a timing alignment, it then becomes possible to predict over the duration of the clock frame period when the bus validity signal used to qualify the data and which is sent from the data send subsystem to be received by the data receive subsystem may be clocked. To assist in this prediction, Waveform Sequencer 132 generates a separate one-clock-period sync pulse for each output clock signal, SYNC PULSE 1 and SYNC PULSE 2, when timing alignment between the two clocks, CLK 1 and CLK 2, has occurred for the clock frame. These sync pulses are then used as inputs to First Synchronization Window Decoder 134 and Second Synchronization Window Decoder 138 for determining the setup time and hold time of the incoming bus validity signal from the data send subsystem relative to the new target clock of the data receive subsystem. The prediction of the time at which a bus validity signal can be clocked is referred to as "synchronization window decode" since the timing information is decoded from a sync pulse.

With the use of output clock frequencies in the range of 40 MHz to 66 MHz, the TIMEBASE CLOCK signal will generally be required to run at 400 MHz or greater. In addition, it is preferred that Waveform Sequencer 132 will become an integrated part of a clock generation chip which would include PLL Frequency Synthesizer 130. FIGS. 13 and 14 demonstrate the timing alignment between the 66 MHz clock (CLK 1) and the 40 MHz clock (CLK 2) with a corresponding 40 MHz synchronization pulse which could be used for transferring data from a 66 MHz system processor to a 40 MHz memory controller.

Figure 10:
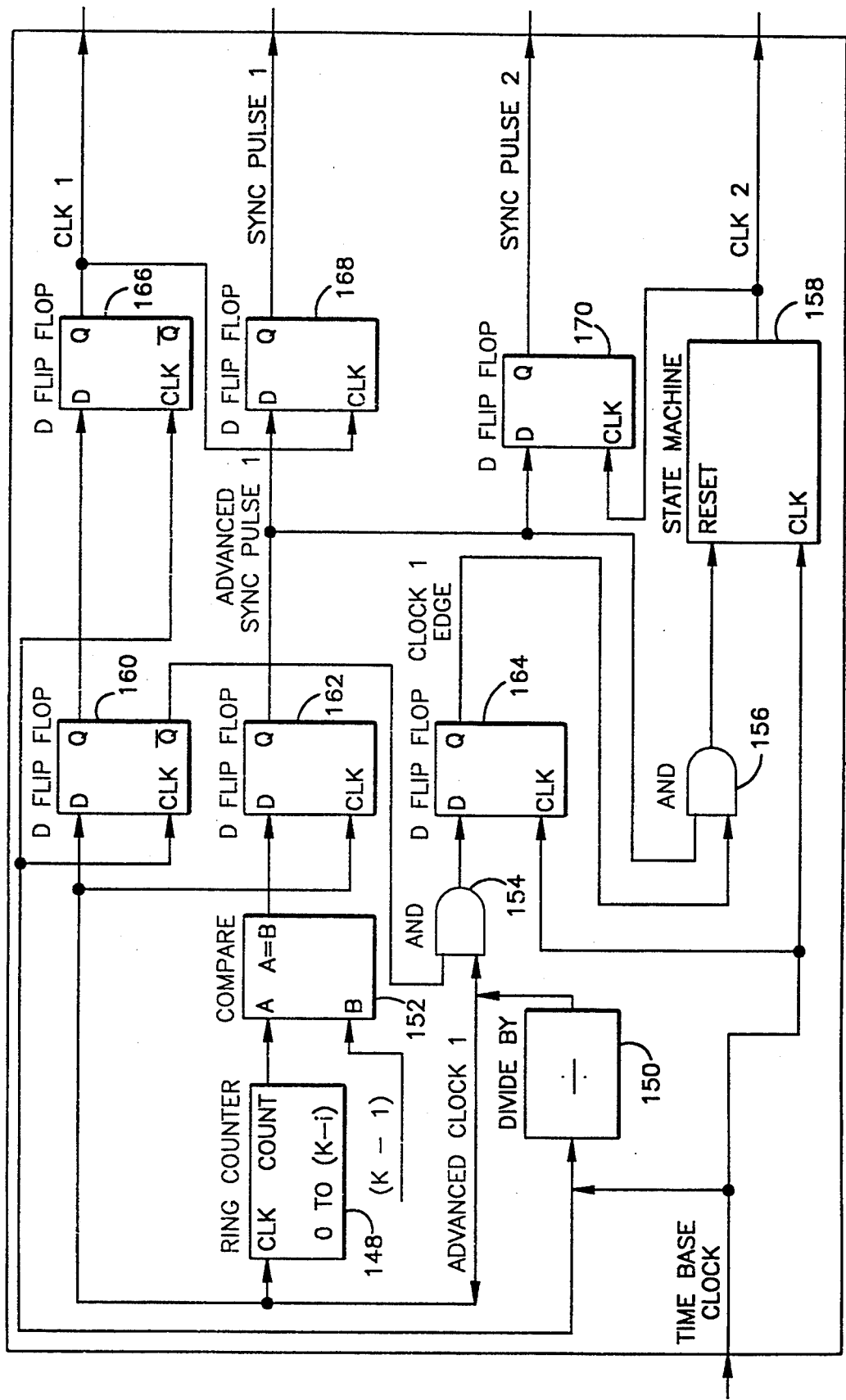
FIG. 10 is a block diagram illustrating a clock generation circuit waveform sequencer.

Referring to FIG. 10, Waveform Sequencer 132 comprises Ring Counter 148, Divide-By Circuit 150, Compare Circuit 152, First AND Gate 154, Second AND Gate 156, State Machine 158, First D Flip-Flop 160, Second D Flip-Flop 162, Third D Flip-Flop 164, Fourth D Flip-Flop 166, Fifth D Flip-Flop 168, and Sixth D Flip-Flop 170.

It is believed that Waveform Sequencer 132 of the present invention can be implemented using circuitry similar to that comprising the GA1110E, which is manufactured by TriQuint Semiconductor, 2300 Owen Street, Santa Clara, CA 95054.

First Synchronization Window Decoder 134 signals First Synchronization Circuit 136 when a bus validity signal generated from the send subsystem clock environment, e.g., the memory controller, contains proper setup time and hold time relative to the receive subsystem clock environment, e.g., the system processor. This information is passed from First Synchronization Window Decoder 134 to First Synchronization Circuit 136 by the SYNC ENABLE 1 signal. Thus, First Synchronization Window Decoder 134 becomes application specific in that it must use SYNC PULSE 1 to determine the current timing relationship between CLK 1 and CLK 2 during the clock frame, which in turn defines whether the setup time and the hold time can be met by a bus validity signal initiated in the send subsystem clock environment, e.g., the memory controller, to be received in a receive subsystem clock environment, e.g., the system processor.

Second Synchronization Window Decoder 138 signals Second Synchronization Circuit 140 when a bus validity signal generated from the send subsystem clock environment, e.g., the system processor, contains proper setup time and hold time relative to the receive subsystem clock environment, e.g., the memory controller. This information is passed from Second Synchronization Window Decoder 138 to Second Synchronization Circuit 140 by the SYNC ENABLE 2 signal. Thus, Second Synchronization Window Decoder 138 becomes application specific in that it must use the sync pulse, SYNC PULSE 2, to determine the current timing relationship between CLK 2 and CLK 1 during the clock frame, which in turn defines whether the setup time and the hold time can be met by a signal initiated in the send subsystem clock environment, e.g., the system processor, to be received in a receive subsystem clock environment, e.g., the memory controller.

Figure 11:
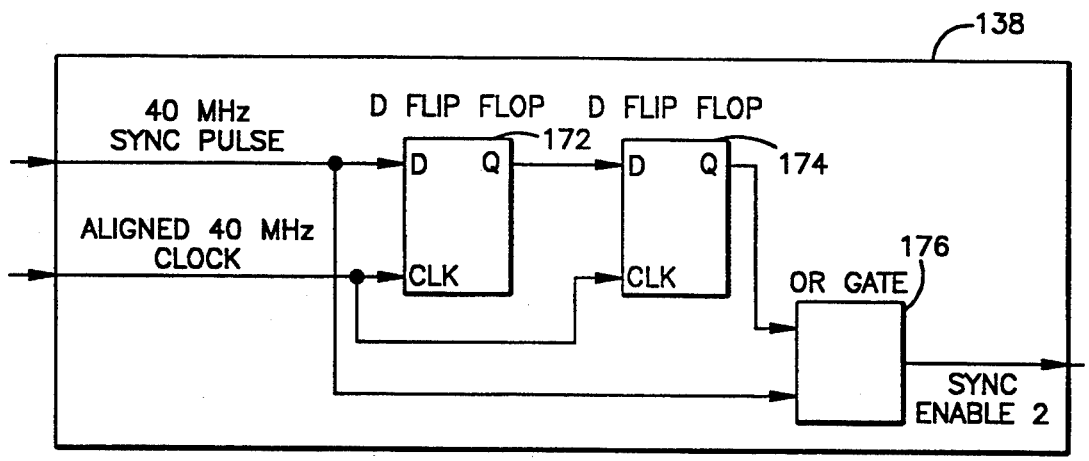
FIG. 11 is a block diagram illustrating a synchronization window decoder circuit.

Referring to FIG. 11, Second Synchronization Window Decoder 138 comprises First D Flip-Flop 172, Second D Flip-Flop 174, and Multi-Input Logic OR Gate 176. First D Flip-Flop 172 is arranged in serial fashion with Second D Flip-Flop 174, with the Q output of First D Flip-Flop 172 connected to the D input of Second D Flip-Flop 174. The active high sync pulse (SYNC PULSE 2) is then fed into First D Flip-Flop 172 in the chain such that it is passed through Second D Flip-Flop 174 in the chain on each successive clock of the data receive subsystem clock. As the sync pulse (SYNC PULSE 2) is passed through the D flip-flop chain, Multi-Input Logic OR Gate 176 is connected to selective Q outputs whose pulse relative to the start of the clock frame will cause the SYNC ENABLE 2 signal to be asserted active high. The selection of the Q outputs are then designed to enable clocking of the received bus validity signal when the applicable setup time and hold time are guaranteed.

Figure 12:
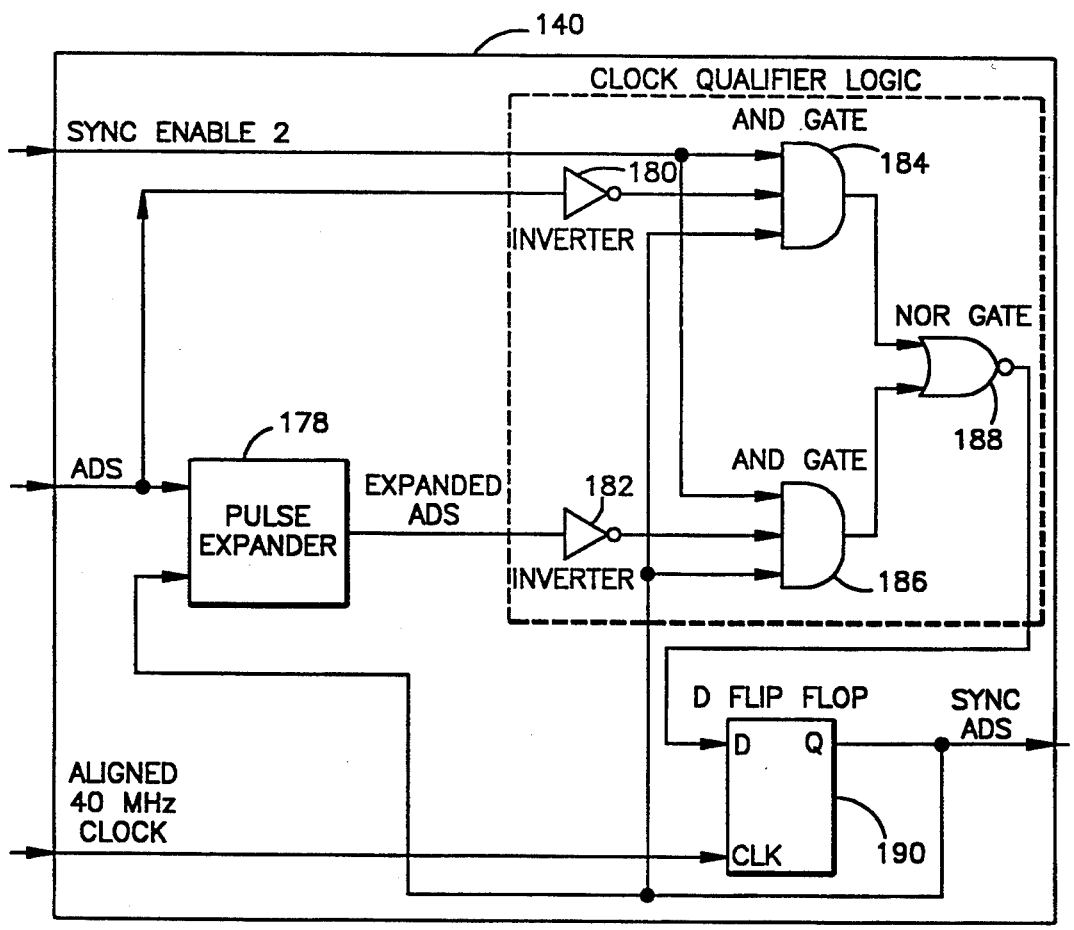
FIG. 12 is a block diagram illustrating a synchronization circuit.

This invention avoids the metastability incurred by the prior art by guaranteeing that the bus validity signal to be synchronized is clocked only when the specified setup time and hold time of D Flip-Flop 190 in FIG. 12 are met. The event defined by the setup time and hold time being properly met is conveyed from Second Synchronization Window Decoder 138 to Second Synchronization Circuit 140 by the SYNC ENABLE 2 signal.

It is to be appreciated that First Synchronization Window Decoder 134 comprises a similar functional design as Second Synchronization Window Decoder 138, but relies on the 66 MHz sync pulse (SYNC PULSE 1) and the 66 MHz aligned clock (CLK 1), both signals being generated by Waveform Sequencer 132. It is to be further appreciated that the event defined by the setup time and hold time being properly met is conveyed from First Synchronization Window Decoder 134 to First Synchronization Circuit 136 by a signal referred to as SYNC ENABLE 1.

With the SYNC ENABLE 1 signal generated such that proper setup time and hold time can be met, First Synchronization Circuit 136 uses the following equations to generate the final output signal, SYNC READY:

```
!EXPANDED READY = !READY
           # !EXPANDED READY & SYNC READY
!SYNC READY:= SYNC READY & !READY      & SYNC
                                        ENABLE 1
           # SYNC READY & !EXPANDED    & SYNC
           READY                        ENABLE 1
``` where "=" indicates the term on the left is assigned to the logic value on the right, ":=" indicates a clocked D type flip-flop, "!" means a logical NOT function, "&" means a logical AND function, and "#" means a logical OR function.

The Boolean equation for EXPANDED READY can then be interpreted as setting EXPANDED READY low when READY is low. Once EXPANDED READY is low it will remain low until SYNC READY is asserted active low. The use of an EXPANDED READY signal is also necessary as a memory element in case READY cannot be clocked immediately because of improper setup. The signal SYNC READY is then set active low upon either READY or EXPANDED READY meeting proper setup to the target clock as enabled by the SYNC ENABLE 1 signal.

With the SYNC ENABLE 2 signal generated such that proper setup time and hold time can be met, Second Synchronization Circuit 140 uses the following equations to generate the final output signal, SYNC ADS:

```
!EXPANDED ADS = !ADS
           # !EXPANDED ADS & SYNC ADS
!SYNC ADS := SYNC ADS & !ADS     & SYNC ENABLE 2
           # SYNC ADS & !EXPANDED & SYNC
           ADS                     ENABLE 2
``` where "=" indicates the term on the left is assigned to the logic value on the right, ":=" indicates a clocked D type flip-flop, "!" means a logical NOT function, "&" means a logical AND function, and "#" means a logical OR function.

The Boolean equation for EXPANDED ADS can then be interpreted as setting EXPANDED ADS low when ADS is low. Once EXPANDED ADS is low it will remain low until SYNC ADS is asserted active low. The use of an EXPANDED ADS signal is required since the ADS pulse width is less than the target clock period while it is also necessary as a memory element in case ADS cannot be clocked immediately because of improper setup. The signal SYNC ADS is then set active low upon either ADS or EXPANDED ADS meeting proper setup to the target clock as enabled by the SYNC ENABLE 2 signal.

Information handling systems operate with known setup times and hold times for the system processor and for the peripheral devices. This invention is adaptable to subsystem designs with individual subsystems operating at different frequencies and is not limited to the examples in this description. First Synchronization Window Decoder 134 and Second Synchronization Window Decoder 138 can be integrated to facilitate data transfer between different subsystem clock environments by selectively adapting the circuit hardware in accordance with a timing analysis which evaluates design parameters including signal setup times, signal hold times, signal valid delay times, and the predetermined timing relationship of the clocks.

Referring to FIG. 12, Second Synchronization Circuit 140 is comprised of Pulse Expander 178, First Inverter 180, Second Inverter 182, First AND Gate 184, Second AND Gate 186, NOR Gate 188, and D Flip-Flop 190. First Inverter 180, Second Inverter 182, First AND Gate 184, Second AND Gate 6, and NOR Gate 188 are collectively referred to as the "clock qualifter logic." The synchronization signal SYNC ADS is generated by clocking the clock qualifter logic output signal with the aligned 40 MHz clock.

It is to be appreciated First Synchronization Circuit 136 comprises the same functional design as Second Synchronization Circuit 140, but relies on a SYNC ENABLE pulse generated by First Synchronization Window Decoder 134, a READY signal generated by Memory Controller 126, and a 66 MHz ALIGNED CLOCK (CLK 1) signal generated by Waveform Sequencer 132. It is to be further appreciated the output signal of First Synchronization Circuit 136 is referred to as SYNC READY.

To illustrate the reduction in synchronization delay achieved by this invention for data being transferred from System Processor 124 to the Memory Controller 126, the example discussed in this section has been recast to include Timing Circuit 116, Clock Generation Circuit 118, First Data Synchronization Circuit 120, Second Data Synchronization Circuit 122, System Processor 124, Memory Controller 126, and System Processor Bus 128. The timing relationship of this invention for data transfer from System Processor 124 to Memory Controller 126 functions as shown in FIGS. 13 and 14, with the signal ADS being expanded as in the prior art example. In this case, however, a SYNC ENABLE signal has been generated by Second Synchronization Window Decoder 138 and is used to signal the 40 MHz subsystem logic of the Second Synchronization Circuit 140 that the EXPANDED ADS signal can be sampled immediately (i.e., on the next rising edge of the 40 MHz clock). Referring to FIG. 13, the resultant SYNC ADS signal has thus been generated one clock earlier than in the prior art synchronization. In addition, it can also be determined by timing analysis that an ADS signal originating immediately after clock 2 or clock 5 of the 66 MHz clock can also be sampled immediately (i.e., on the next rising edge of the 40 MHz clock). Referring to FIG. 14, however, an ADS signal originating on clock 3 or clock 4 of the 66 MHz clock must wait until the next 40 MHz clock to be sampled since the ADS signal will not meet proper setup time when driven from the clock 4 edge. Thus, in working out the average synchronization penalty of this invention, approximately one clock can be saved in 3 out of 5 cases within a clock frame cycle of the 40 MHz clock compared to the prior art synchronization. By using the present invention, the average synchronization penalty is reduced to 0.9 cycle of the 40 MHz clock from 1.5 cycles of the 40 MHz clock demonstrated in the prior art example. Similarly, by using the present invention the maximum synchronization penalty is reduced to 1.5 cycles of the 40 MHz clock from 2.0 cycles of the 40 MHz clock cycles demonstrated in the prior art example. FIG. 13 illustrates a typical synchronization penalty incurred using this decoded synchronization window by showing the ADS signal originating on clock 1 of the aligned 66 MHz clock. FIG. 14 illustrates a maximum synchronization penalty for this decoded synchronization window by showing the ADS signal originating on clock 3 of the aligned 66 MHz clock.

It is to be appreciated that a similar analysis will demonstrate that a reduction for both the average synchronization delay and the maximum synchronization delay achieved by this invention for data being transferred from Memory Controller 126 to System Processor 124.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, the invention can be used to interface 50 MHz synchronous clocked system bus with a 33 MHz clocked PCI bus. Therefore, the invention in its broader aspects is not limited to the specific details, representative apparatus and method, and illustrative examples shown and described. Accordingly, departures may be made from such details without departing from the spirit or scope of the applicant's general inventive concept.

We claim:

1. An apparatus for synchronizing data transfer from a first system operating responsive to a first frequency clock signal to a second system operating responsive to a second frequency clock signal, comprising:
   (a) means for generating said first frequency clock signal and said second frequency clock signal at a fixed predetermined timing relationship relative to one-another over a clock frame period to minimize synchronization setup time and hold time;
   (b) means for decoding the fixed predetermined timing relationship between said second frequency clock signal and said first frequency clock signal during the clock frame period;
   (c) means for generating a sync enable signal responsive to the decoded fixed predetermined timing relationship, said sync enable signal indicating that a first system bus validity signal satisfies valid setup time and hold time requirements relative to said second frequency clock signal;
   (d) means for generating a synchronization signal by clocking said first system bus validity signal on the next clock edge of said second frequency clock signal as qualified by said sync enable signal; and
   (e) means for transferring data from said first system to said second system responsive to said synchronization signal.

2. A method of synchronizing data transfer from a first system operating responsive to a first frequency clock signal to a second system operating responsive to a second frequency clock signal, comprising the steps of:
   (a) generating said first frequency clock signal and said second frequency clock signal at a fixed predetermined timing relationship relative to one-another over a clock frame period to minimize synchronization setup time and hold time;
   (b) decoding the fixed predetermined timing relationship between said second frequency clock signal and said first frequency clock signal during the clock frame period;
   (c) generating a sync enable signal responsive to said decoded timing relationship, said sync enable signal indicating that a first system bus validity signal satisfies valid setup time and hold time requirements relative to said second frequency clock signal;
   (d) generating a synchronization signal by clocking said first system bus validity signal on the next clock edge of said second frequency clock signal as qualified by said sync enable signal; and
   (e) transferring data from said first system to said second system responsive to said synchronization signal.

3. An information handling system having subsystems operating at different clock frequencies and being capable of transferring data between those subsystems, comprising:
   (a) a first subsystem requiring for its operation a first clock signal at a first predetermined frequency, and having a bus associated therewith, said first subsystem being configured to operate as a data send subsystem and as a data receive subsystem;
   (b) a second subsystem in circuit communication with said first subsystem via the bus and requiring for its operation a second clock signal at a second predetermined frequency, said second subsystem being configured to operate as a data send subsystem and as a data receive subsystem;
   (c) a timing circuit in circuit communication with said first subsystem and said second subsystem and responsive to a reference clock signal, said timing circuit being configured to generate timing pulses for operation of the information handling system;
   (d) a clock generation circuit in circuit communication with said first subsystem and said second subsystem and responsive to the timing pulses of said timing circuit, and being configured to generate (i) said first clock signal and said second clock signal at a fixed predetermined timing relationship relative to one-another over a clock frame period to minimize synchronization setup time and hold time, and (ii) a first sync pulse for signalling timing information and a second sync pulse for signalling timing information;

(e) a first synchronization window decoder circuit in circuit communication with said clock generation circuit and responsive to said first clock signal and said first sync pulse, and being configured to decode the predetermined timing relationship between said first clock signal and said second clock signal during the clock frame period, and being configured to generate a first sync enable signal, said first sync enable signal being used to signal that a second subsystem bus validity signal satisfies valid setup time and hold time requirements relative to said first clock signal;

(f) a first synchronization circuit in circuit communication with said first subsystem, said clock generation circuit, and said first synchronization window decoder circuit, and responsive to said first clock signal, said first sync enable signal, and said second subsystem bus validity signal, and being configured to generate a first synchronization signal by clocking said second subsystem bus validity signal on the next clock edge of said first clock signal as qualified by said first sync enable signal, said first synchronization signal being used to control data transfer from said second subsystem to said first subsystem;

(g) a second synchronization window decoder circuit in circuit communication with said clock generation circuit and responsive to said second clock signal and said second sync pulse, and being configured to decode the predetermined timing relationship between said second clock signal and said first clock signal during the clock frame period, and being configured to generate a second sync enable signal, said second sync enable signal being used to signal that a first subsystem bus validity signal satisfies valid setup time and hold time requirements relative to said second clock signal;

(h) a second synchronization circuit in circuit communication with said second subsystem, said clock generation circuit, and said second synchronization window decoder circuit, and responsive to said second clock signal, said second sync enable signal, and said first subsystem bus validity signal, and being configured to generate a second synchronization signal by clocking said first subsystem bus validity signal on the next clock edge of said second clock signal as qualified by said second sync enable signal, said second synchronization signal being used to control data transfer from said first subsystem to said second subsystem; and (i) a data transfer device in circuit communication with said first subsystem, said second subsystem, said first synchronization circuit, and said second synchronization circuit, said data transfer device being configured to transfer data between said first subsystem and said second subsystem via the bus, the transfer of data from said second subsystem to said first subsystem being responsive to said first synchronization signal and the transfer of data from said first subsystem to said second subsystem being responsive to said second synchronization signal.

4. The information handling system of claim 3, wherein said first subsystem comprises a system processor and wherein said second subsystem comprises a peripheral device.

5. The information handling system of claim 3, wherein said timing circuit comprises a phase-locked loop frequency synthesizer for generating timing pulses for operation of the information handling system.

6. The information handling system of claim 3, wherein said clock generation circuit comprises a waveform sequencer for generating (i) said first clock signal and said second clock signal at the fixed predetermined timing relationship relative to one-another over the clock frame period to minimize synchronization setup time and hold time, and (ii) said first sync pulse for conveying timing information and said second sync pulse for conveying timing information.

7. The information handling system of claim 3, wherein said first clock signal and said second clock signal are aligned such that periodically said first clock signal and said second clock signal have rising edges that are substantially aligned.

8. The information handling system of claim 7, wherein said first synchronization signal becomes active responsive to the rising edges of said first clock signal, and said second clock signal being substantially aligned and said second synchronization signal becomes active responsive to the rising edges of said second clock signal and said first clock signal being substantially aligned.

9. The information handling system of claim 3, wherein said first clock signal and said second clock signal are aligned such that periodically said first clock signal and said second clock signal have falling edges that are substantially aligned.

10. The information handling system of claim 9, wherein said first synchronization signal becomes active responsive to the falling edges of said first clock signal and second clock signal being substantially aligned, and said second synchronization signal becomes active responsive to the falling edges of said second clock signal and said first clock signal being substantially aligned.

11. The information handling system of claim 3, wherein said bus comprises a system processor bus, and further comprising a peripheral bus interface associated with said second subsystem, said peripheral bus interface being in circuit communication with said first subsystem via said system processor bus.

12. The information handling system of claim 3, wherein said first subsystem bus validity signal defines the start of a first subsystem bus cycle in response to a first subsystem bus signal satisfying valid delay time requirements and said second subsystem bus validity signal defines the start of a second subsystem bus cycle in response to a second subsystem bus signal satisfying valid delay time requirements.

13. The information handling system of claim 12, wherein said first subsystem comprises a central processing unit, said bus comprises a system processor bus, said first subsystem bus validity signal comprises an address strobe signal generated by said central processing unit responsive to designated signals on predetermined lines of said system processor bus currently satisfying valid delay time requirements, and further comprising a peripheral bus interface associated with said second subsystem, said peripheral bus interface being in circuit communication with said first subsystem via said system processor bus.

14. The information handling system of claim 13, wherein said second subsystem comprises a memory controller and said second subsystem bus validity signal comprises a ready signal generated by said memory controller responsive to designated signals on predetermined lines of said peripheral bus interface currently satisfying valid delay time requirements.

15. A method of signal synchronization for an information handling system having a first subsystem operating responsive to a first clock signal at a first predetermined frequency and a second subsystem operating responsive to a second clock signal at a second predetermined frequency, and being capable of transferring data between one-another, comprising the steps of:

(a) generating (i) the first clock signal at the first predetermined frequency and the second clock signal at the second predetermined frequency, the first clock signal and the second clock signal having a fixed predetermined timing relationship relative to one another over a clock frame period to minimize synchronization setup time and hold time, and (ii) a first sync pulse for signalling timing information and a second sync pulse for signalling timing information;

(b) decoding the predetermined timing relationship between said first clock signal and said second clock signal during the clock frame period responsive to said first clock signal and to said first sync pulse;

(c) generating a first sync enable signal responsive to said first clock signal and to said first sync pulse to signal that a second subsystem bus validity signal satisfies valid setup time and hold time requirements relative to said first clock signal;

(d) generating a first synchronization signal by clocking said second subsystem bus validity signal on the next clock edge of said first clock signal as qualified by said first sync enable signal, said first synchronization signal being used to control data transfer from said second subsystem to said first subsystem;

(e) decoding the predetermined timing relationship between said second clock signal and said first clock signal during the clock frame period responsive to said second clock signal and to said second sync (f) generating a second sync enable signal responsive to said second clock signal and to said second sync pulse to signal that a first subsystem bus validity signal satisfies valid setup time and hold time requirements relative to said second clock signal;

(g) generating a second synchronization signal by clocking said first subsystem bus validity signal on the next clock edge of said second clock signal as qualified by said second sync enable signal, said second synchronization signal being used to control data transfer from said first subsystem to said second subsystem; and (h) transferring data (i) from said first subsystem to said second subsystem responsive to said second synchronization signal, and (ii) from said second subsystem to said first subsystem responsive to said first synchronization signal.

* * * * *